(12) United States Patent
Okamoto

(10) Patent No.: US 9,188,734 B2
(45) Date of Patent: Nov. 17, 2015

(54) LIGHT GUIDE AND ILLUMINATION DEVICE

(71) Applicant: KYOCERA Document Solutions Inc., Osaka (JP)

(72) Inventor: Katsuhiko Okamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 55 days.

(21) Appl. No.: 14/290,206

(22) Filed: May 29, 2014

(65) Prior Publication Data

US 2014/0355291 A1    Dec. 4, 2014

(30) Foreign Application Priority Data

May 31, 2013   (JP) .................. 2013-116518

(51) Int. Cl.
*F21V 8/00* (2006.01)
*G03G 15/043* (2006.01)
*H04N 1/028* (2006.01)

(52) U.S. Cl.
CPC .......... *G02B 6/0096* (2013.01); *G03G 15/0435* (2013.01); *H04N 1/02835* (2013.01)

(58) Field of Classification Search
CPC ............. G02B 6/0096; G03G 15/0435; H04N 1/02835
See application file for complete search history.

(56) References Cited

U.S. PATENT DOCUMENTS

| | | | |
|---|---|---|---|
| 7,953,312 B2 | 5/2011 | Kabuki et al. | |
| 8,371,736 B2 * | 2/2013 | Inoue | G02B 6/0001 358/484 |
| 8,724,185 B2 * | 5/2014 | Ouchi | G02B 6/0001 358/474 |
| 2011/0149590 A1 | 6/2011 | Kamei et al. | |
| 2012/0014136 A1 | 1/2012 | Lee et al. | |
| 2012/0182500 A1 | 7/2012 | Lee et al. | |
| 2012/0230023 A1 | 9/2012 | Lin | |

FOREIGN PATENT DOCUMENTS

| | | |
|---|---|---|
| EP | 2 476 951 | 7/2012 |
| JP | 2002-297071 A | 10/2002 |
| JP | 2008-216409 A | 9/2008 |
| JP | 2009-181814 A | 8/2009 |

(Continued)

OTHER PUBLICATIONS

European Search Report dated Oct. 22, 2014 for EP 14170192.0.

(Continued)

*Primary Examiner* — Stephen F Husar

(57) ABSTRACT

A light guide includes: an incident surface, an exit surface and two reflective surfaces. The incident surface allows light emitted from a light source to be incident thereon. The exit surface extends in a main scanning direction and allows the incident light to exit the light guide therethrough. Two reflective surfaces are located opposite to the exit surface to extend in the main scanning direction and are configured to reflect the incident light toward the exit surface. One of the reflective surfaces includes a plurality of light reflecting patterns formed integrally therewith and having an oval hemispherical prism shape. The other reflective surface is a separate surface from the one reflective surface and is formed in a planar shape that enables attachment of a reflective member allowing the incident light to be reflected thereon toward the exit surface.

7 Claims, 8 Drawing Sheets

(56) References Cited

FOREIGN PATENT DOCUMENTS

| | | |
|---|---|---|
| JP | 4793288 B | 10/2011 |
| TW | I379964 B | 12/2012 |

OTHER PUBLICATIONS

Notice of rejection mailed by Japan patent Office on Jul. 21, 2015 in the corresponding Japanese patent application No. 2013-116518.

* cited by examiner

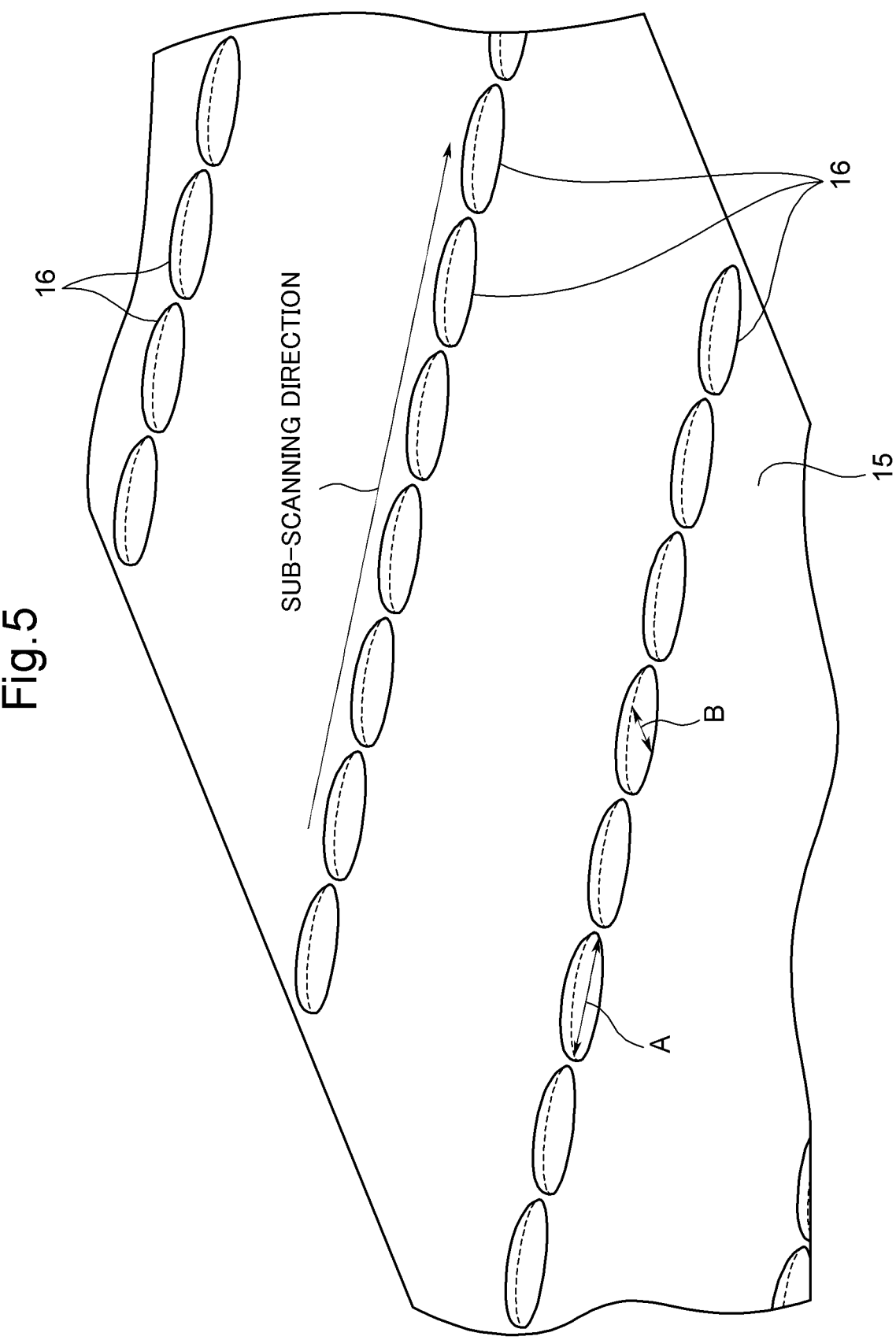

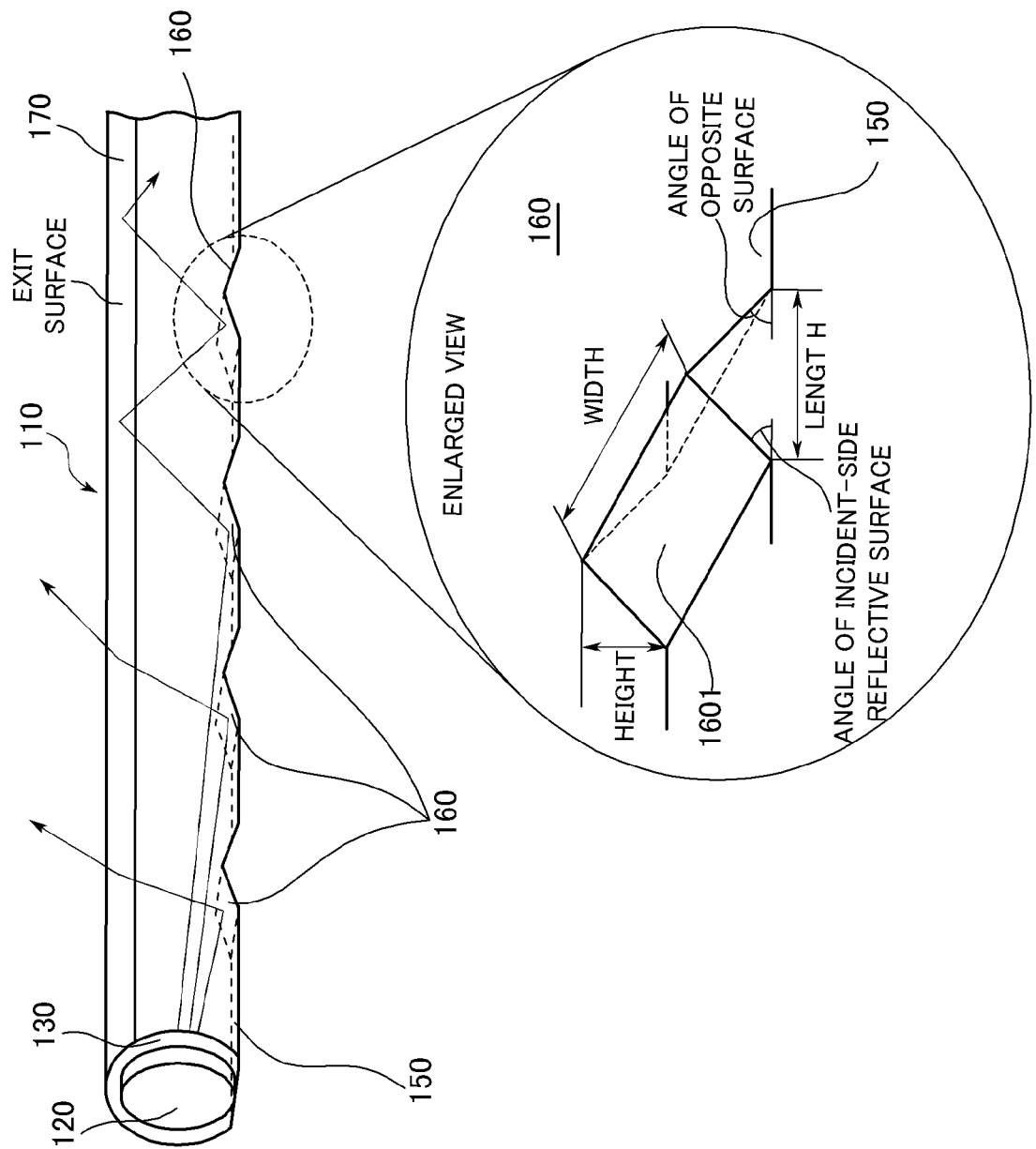

LIGHT GUIDE AND ILLUMINATION DEVICE

INCORPORATION BY REFERENCE

This application claims priority to Japanese Patent Application No. 2013-116518 filed on 31 May 2013, the entire contents of which are incorporated by reference herein.

BACKGROUND

The present disclosure relates to light guides and illumination devices and particularly relates to a technique for reflecting light, which has entered a light guide, toward the exit surface of the light guide.

Some image forming apparatuses, such as multifunction peripherals, employ as a light source section for an image reading device, such as a scanner, a line light source includes a resin-made light guide in which a rod-shaped, and an LED capable of emitting light to the interior of the light guide through a longitudinal end surface of the light guide. The light source section is required to linearly illuminate an original document to be read in synchronism with reading of a line sensor. For this purpose, a surface of the light guide opposite to an exit surface thereof through which light exits the light guide is provided with light reflecting or scattering patterns, so that the patterns can deflect light, which has entered the light guide, toward the exit surface to allow linear illuminating light to exit the light guide in the direction toward the original document.

Such light source sections include those of double-sided illumination type which are configured to illuminate an original document to be read from both sides in a sub-scanning direction (a direction perpendicular to a main scanning direction of the light source section). The light source sections further include those of one-sided illumination type configured to illuminate an original document to be read only from either side in the sub-scanning direction. The light source sections of double-sided illumination type offer superior reading performance because of illumination onto an object of reading from both sides. The light source sections of one-sided illumination type are more favorable in cost terms than those of double-sided illumination type, although if the object of reading is an uneven original document (an original document having a piece of paper attached thereto or an original document having a non-flat shape), they are likely to provide shadows corresponding to recesses in the document having not been illuminated An example of the light reflecting or scattering pattern is a prism provided in the interior of a cylindrical light guide made of a light transmissive material. The prism is provided on a reflective surface of the light guide opposite to an exit surface (texture surface) thereof and allows incident light from a light source (such as a white LED), which has entered the light guide through an incident surface thereof located at one longitudinal end, to be reflected toward the exit surface. An example of the prism used is an oval hemispherical prism having excellent diffusion of exit light in the sub-scanning direction.

SUMMARY

A light guide according to one aspect of the present disclosure is formed of a light transmissive member extending in a direction of an optical axis of light incident on an interior of the light guide and configured to reflect the incident light in a specific direction. The light guide includes an incident surface, an exit surface, and two reflective surfaces.

The incident surface is provided at least one of both longitudinal ends of the light guide and allows light emitted from a light source to be incident thereon.

The exit surface forms one side surface of the light guide extending in the direction of the optical axis of the light incident through the incident surface and allows the incident light to exit the light guide therethrough.

The two reflective surfaces are located opposite to the exit surface to extend in the direction of the optical axis and configured to reflect the incident light toward the exit surface.

In addition, one of the reflective surfaces includes a plurality of light reflecting patterns formed integrally therewith, the plurality of light reflecting patterns having an oval hemispherical prism shape rising toward the exit surface and being configured to reflect the incident light toward the exit surface, and the other reflective surface is a separate surface from the one reflective surface and is formed in a planar shape that enables attachment of a reflective member allowing the incident light to be reflected thereon toward the exit surface.

BRIEF DESCRIPTION OF THE DRAWINGS

FIG. 5 is an enlarged perspective view showing light reflecting patterns formed on a reflective surface.

FIG. 6 is a view showing a light guide having planar, not oval hemispherical, light reflecting patterns.

DETAILED DESCRIPTION

Figure 1:
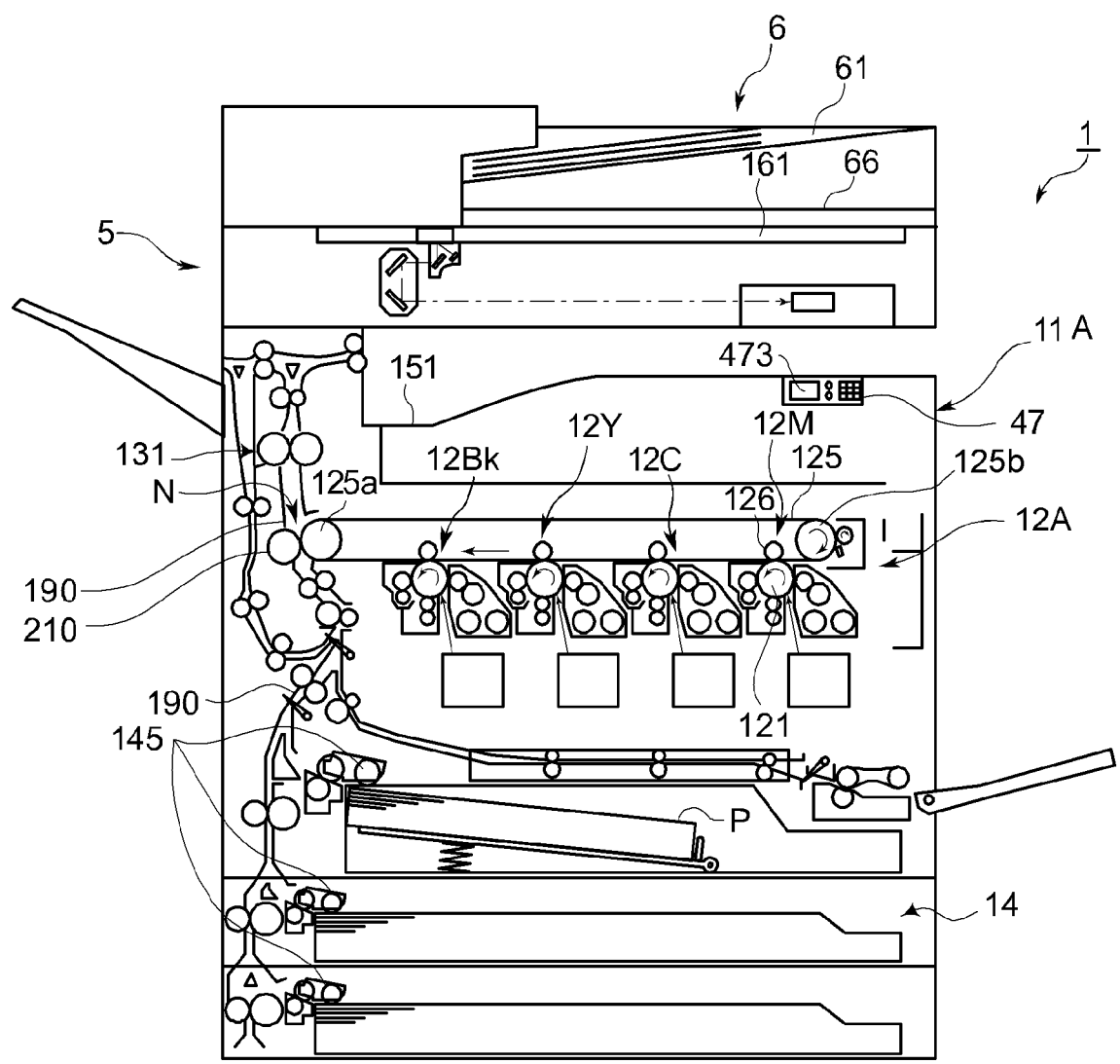
FIG. 1 is a front cross-sectional view showing the structure of an image forming apparatus including an image reading device equipped with an illumination device according to one embodiment of the present disclosure.

Hereinafter, a description will be given of a light guide according to one embodiment of the present disclosure and an illumination device with the light guide with reference to the drawings. FIG. 1 is a front cross-sectional view showing the structure of an image forming apparatus including an image reading device equipped with an illumination device according to the one embodiment of the present disclosure.

The image forming apparatus 1 according to the one embodiment of the present disclosure is a multifunction peripheral having multiple functions including, for example, a copy function, a print function, a scan function, and a facsimile function. The image forming apparatus 1 is made up so that an apparatus body 11A thereof includes an operating section 47, an image forming section 12A, a fixing section 131, a paper feed section 14, a document feed section 6, an image reading device 5, and so on.

The operating section 47 is configured to receive operator's commands for various types of operations and processing executable by the image forming apparatus 1, such as a command to execute an image forming operation and a command to execute a document reading operation. The operating section 47 includes a display 473 configured to display operation guidance and so on for the operator.

In a document reading operation of the image forming apparatus 1, the image reading device 5 optically reads an image of an original document being fed from the document feed section 6 or an image of an original document placed on an original glass plate 161 to generate image data. The image data generated by the image reading device 5 is stored on an internal HDD, a network-connected computer or the like.

In an image forming operation of the image forming apparatus 1, the image forming section 12A forms a toner image on a recording paper sheet P serving as a recording medium fed from the paper feed section 14, based on image data generated by the document reading operation, image data received from a network-connected computer or a user terminal, such as a smartphone, or image data stored on the internal HDD. Each of image forming units 12M, 12C, 12Y, and 12Bk of the image forming section 12A includes a photosensitive drum 121, a developing device (not shown) operable to supply toner to the photosensitive drum 121, a toner cartridge (not shown) for holding toner, a charging device (not shown), an exposure device (not shown), and a primary transfer roller 126.

In the case of color printing, the image forming unit 12M for magenta, the image forming unit 12C for cyan, the image forming unit 12Y for yellow, and the image forming unit 12Bk for black of the image forming section 12A form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125 mounted around a drive roller 125a and a driven roller 125b.

The outer peripheral surface of the intermediate transfer belt 125 is set to an image carrying surface to which a toner image is to be transferred. The intermediate transfer belt 125 is driven by the drive roller 125a while engaging against the peripheral surfaces of the photosensitive drums 121. The intermediate transfer belt 125 endlessly runs between the drive roller 125a and the driven roller 125b while synchronizing with the rotation of each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and the drive roller 125a with the intermediate transfer belt 125 in between, to a recording paper sheet P conveyed from the paper feed section 14 along a conveyance path 190. Thereafter, the fixing section 131 fixes the toner image on the recording paper sheet P by the application of heat and pressure. The recording paper sheet P having a multicolor image fixed thereon by the completion of the fixing treatment is discharged to a paper output tray 151.

The paper feed section 14 includes a plurality of paper feed cassettes. A control section (not shown) rotationally drives a pick-up roller 145 of the paper feed cassette containing recording paper sheets of the size designated by an operator's command and thereby allows the pick-up roller 145 to feed a recording paper sheet P contained in the paper feed cassette toward the nip N.

Figure 2:
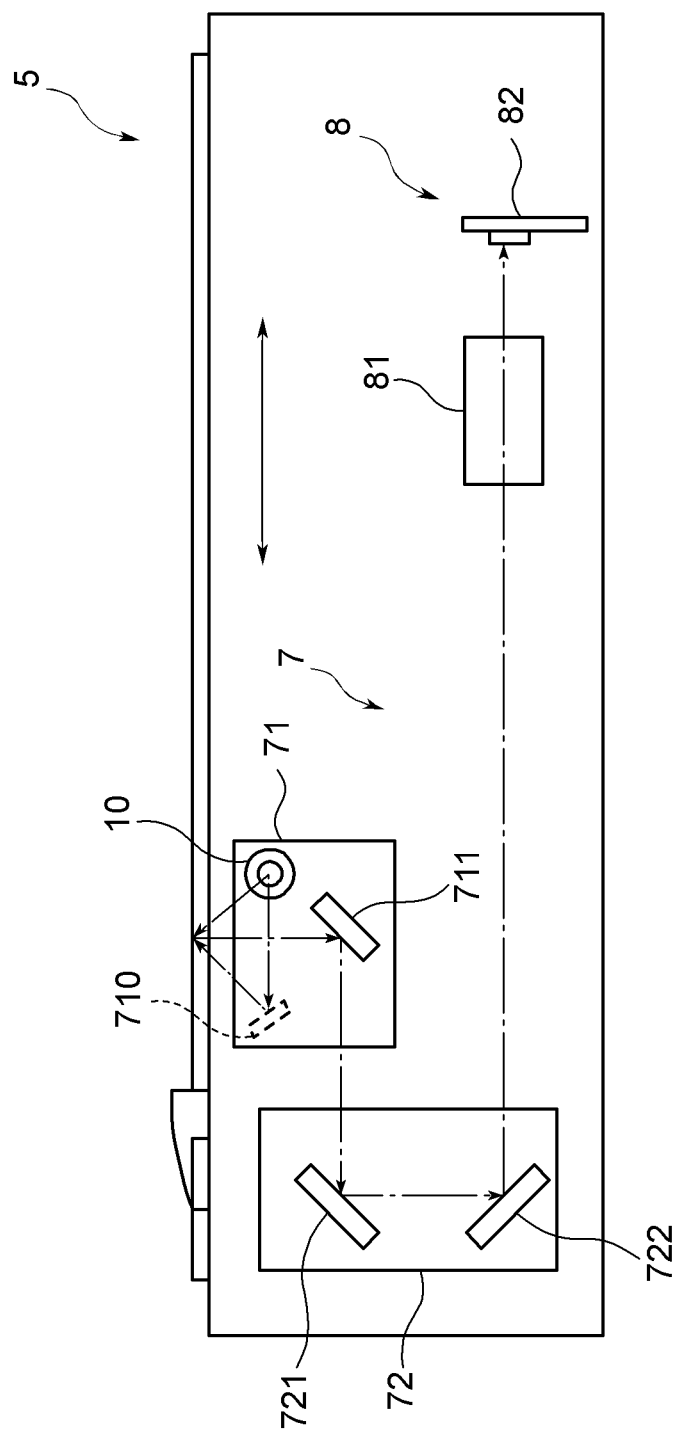
FIG. 2 is an internal side view showing a schematic structure of the image reading device.

Next, a description will be given of the structure of the image reading device 5. FIG. 2 is an internal side view showing a schematic structure of the image reading device 5.

The image reading device 5, as shown in FIG. 2, includes an optical scanning device 7 and an image pickup unit 8.

The optical scanning device 7 includes a first optical system unit 71 and a second optical system unit 72.

The first optical system unit 71 includes an illumination device 10 and a first mirror 711. The illumination device 10 is disposed facing and below the original glass plate 161 in order to illuminate a reading surface of an original document, i.e., illuminate above. The illumination device 10 shown by the solid line is of one-sided illumination type. The illumination device 10 includes a rod-shaped light guide and a light source disposed at a longitudinal end of the light guide, as will hereinafter be described in detail. The illumination device 10 extends in a depth direction of FIG. 2. The direction of extension of the illumination device 10 is a main scanning direction during reading of the original document. The light guide has one reflective surface (to be described later) and, as shown in FIG. 2, allows light emitted from a light source to be reflected on the reflective surface and exit the light guide in one direction.

Alternatively, when the illumination device 10 is of double-sided illumination type, it further includes a reflective mirror 710 as shown by the broken line in FIG. 2. In this case, the light guide has two reflective surfaces (to be described later) and allows light from the light source to be reflected on the two reflective surfaces and exit the light guide in two directions as shown by the solid and dot-dash lines in FIG. 2. One path of light (the solid line) emitted is directed to the document reading position on the original glass plate 161 and the other path of light (the dot-dash lines) is directed to the reflective mirror 710. The reflective mirror 710 allows the emitted light to be reflected toward the document reading position. The illumination device 10 of double-sided illumination type illuminates the document reading position from both sides in the sub-scanning direction.

The illumination device 10 of one-sided illumination type illuminates the original document to be read only from one side in the sub-scanning direction as shown by the solid line in FIG. 2. Therefore, the illumination device 10 of this type is more favorable in cost terms because of its simpler structure. However, when the illumination device 10 of one-sided illumination type illuminates an uneven original document (such as an original document with another piece of paper attached thereto or an original document having a non-flat shape), recesses in the surface having not been illuminated create shadow. On the other hand, the illumination device 10 of double-sided illumination type, although relatively costly, can illuminate the document reading position from both sides in the sub-scanning direction as described above. Therefore, even when illuminating an uneven original document, the illumination device 10 of this type can illuminate uneven portions of the document to reduce the creation of shadows.

The first mirror 711 is configured to receive light reflected on the reading surface of the original document placed on the original glass plate 161 by the application of light of the illumination device 10 to the original document and horizontally redirect the reflected light. The first mirror 711 is disposed below the original glass plate 161. The illumination device 10 and the first mirror 711 are mounted to an unshown support member.

The second optical system unit 72 includes a second mirror 721 and a third mirror 722. The second mirror 721 is configured to receive light reflected by the first mirror 711 of the first optical system unit 71 and redirect the reflected light substantially vertically downward. The third mirror 722 is configured to substantially horizontally redirect the reflected light from the second mirror 721 to guide it toward the image pickup unit 8. The second mirror 721 and the third mirror 722 are mounted to an unshown support member.

The illumination device 10 and the mirrors provided in the first and second optical system units 71, 72 have an elongated shape extending in the main scanning direction and having a length substantially equal to the length of the original glass plate 161.

The image reading device 5 is internally provided with an unshown traveling rail for use to guide the movement of the optical scanning device 7 in the direction of the arrow. Thus, the optical scanning device 7 equipped with the first and second optical system units 71, 72 can reciprocate in a sub-scanning direction (a direction perpendicular to the main scanning direction), i.e., in the direction of the arrow shown in FIG. 2, and in parallel with the surface of the original glass plate 161 to enable reading of image information of the entire reading surface of the original document placed on the original glass plate 161.

The image pickup unit 8 is fixed to a lower portion of the interior of the image reading device 5. The image pickup unit 8 includes an imaging lens 81 as an optical element and a line sensor 82 as an image pickup device. The light reflected on the reading surface of the original document and then reflected by the third mirror 722 of the second optical system unit 72 enters the imaging lens 81. The imaging lens 81 forms an image of the reflected light on a surface of the line sensor 82 provided downstream in the optical path. The line sensor 82 is configured to generate a voltage indicating and according to the intensity of light received thereon, i.e., convert optical information received by its light-receiving element into electrical signals, and output the signals to the unshown control section. In this manner, using the line sensor 82, the image of the original document to be read can be read by the image reading device 5.

Figure 3:
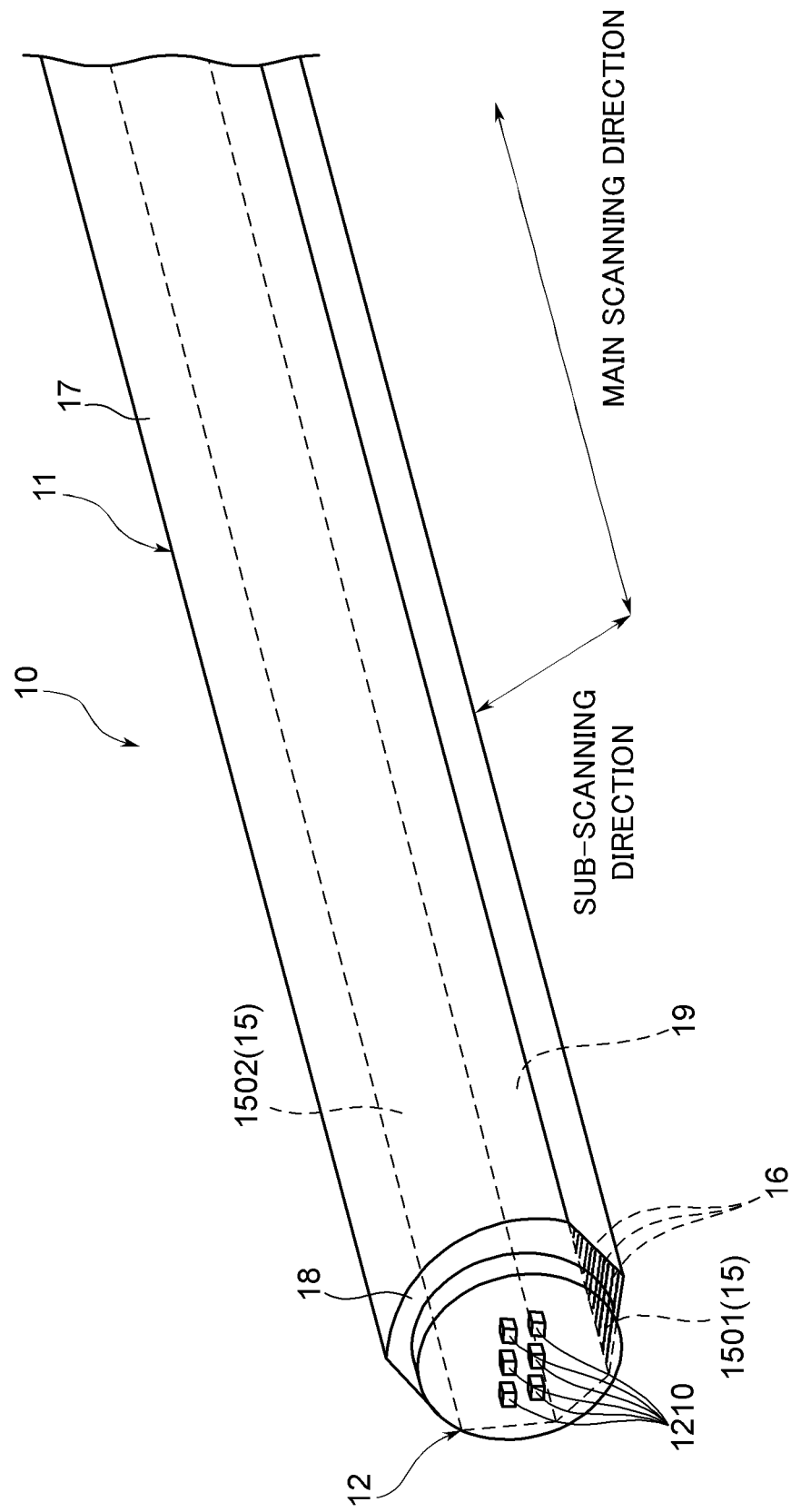
FIG. 3 is a perspective view showing the internal structure of the illumination device.
Figure 4:
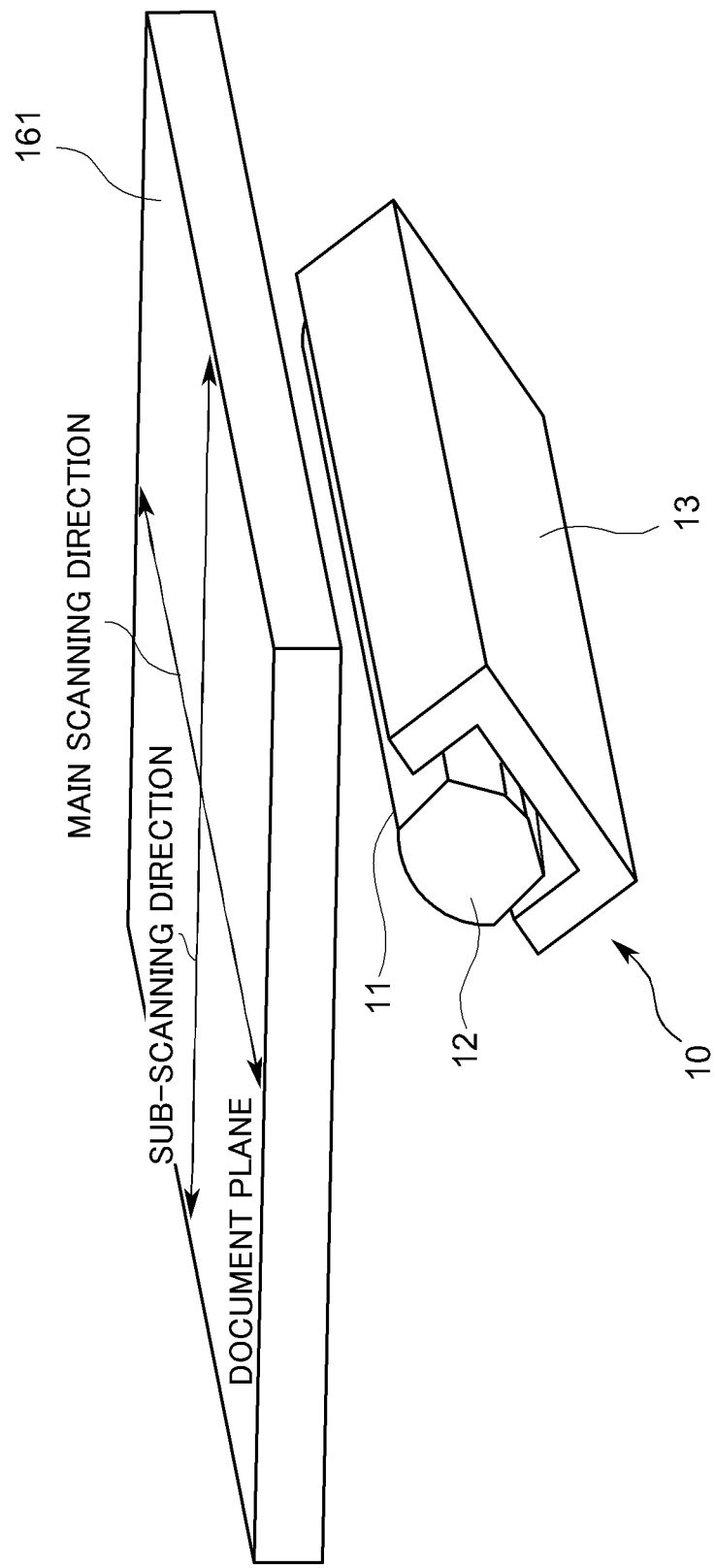
FIG. 4 is a perspective view showing the illumination device and an original glass plate of the image forming apparatus.

Next, a description will be given of the illumination device 10 included in the image reading device 5. FIG. 3 is a perspective view showing the internal structure of the illumination device 10. FIG. 4 is a perspective view showing the illumination device 10 and the original glass plate 161.

The illumination device 10 includes a light guide 11, a light source 12, and a reflector 13.

The light guide 11 extends in a direction of the optical axis of light incident on the interior of the light guide 11 from the light source 12. Since the light guide 11 extends in the main scanning direction as described previously, the direction of the optical axis coincides with the main scanning direction. The light guide 11 is formed of, for example, a light transmissive member made of resin and allows two constituent parts of a reflective surface 15 thereof to reflect incident light from the light source 12 in two different directions toward an exit surface 17 thereof.

The light guide 11, as shown in FIG. 3, includes an incident surface 18, the exit surface 17, and the reflective surface 15 which are formed thereon.

At least one of both the longitudinal end surfaces of the light guide 11 provides the incident surface 18. A description in this embodiment will be given of the case where only one of the longitudinal end surfaces is the incident surface 18. The light source 12 is mounted to the incident surface 18. Light emitted from the light source 12 enters the interior of the light guide 11 through the incident surface 18.

The exit surface 17 extends in the main scanning direction and forms one side surface of the light guide 11. In this embodiment, the exit surface 17 forms a top surface of the light guide 11. The light having entered the interior of the light guide 11 through the incident surface 18 is reflected on the reflective surface 15 and then exits the light guide 11 through the exit surface 17.

The reflective surface 15 includes two reflective surfaces 1501, 1502. The reflective surfaces 1501, 1502 are located opposite to the exit surface 17 to extend in the sub-scanning direction. The reflective surfaces 1501, 1502 each reflect the incident light, which has entered the interior of the light guide 11 through the incident surface 18, toward the exit surface 17. In this embodiment, the reflective surface 1501 is formed as one of two side surfaces adjacent to a bottom surface 19 of the light guide 11 and the reflective surface 1502 is formed as the other side surface adjacent to the bottom surface 19.

The reflective surface 1501 is of generally planar shape and the generally planar surface has a plurality of light reflecting patterns 16 (to be described later in detail) formed thereon to reflect the incident light toward the exit surface 17. The light reflecting patterns 16 are formed integrally with the light guide 11 from the same material as the light guide 11.

The reflective surface 1502 is formed in a planar shape as a separate surface from the reflective surface 1501. Thus, the reflective surface 1502 enables attachment of a reflective member 1521 (see FIG. 8) allowing incident light through the incident surface 18 to be reflected thereon toward the exit surface 17. Examples of the reflective member 1521 used include, for example, a silk-screened member and a high-reflection member. The reflective member 1521 for the reflective surface 1502 is afterwards attached to the reflective surface 1502 after resin molding of the light guide 11 in a mold.

The light source 12 is formed of, for example, an LED 1210. The light source 12 is mounted on the exterior of the incident surface 18 of the light guide 11. In this embodiment, an example is shown where six LEDs 1210 are provided as the light source 12. The direction of emission of light of the light source 12 toward the interior of the light guide 11 through the incident surface 18 (the direction of the optical axis) is a longitudinal direction of the light guide 11, i.e., the main scanning direction.

As shown in FIG. 4, the reflector 13 is disposed facing the light guide 11 and on the opposite side of the light guide 11 to the original glass plate 161. The reflector 13 allows, out of light rays emitted from the light source 12 and entering the light guide 11 through the incident surface 18, light rays leaking from the light guide 11 to be reflected thereon toward the document reading position on the original glass plate 161. Thus, light emitted from the light source 12 and entering the light guide 11 through the incident surface 18 can be efficiently illuminated onto the document reading position.

Next, a description will be given of the light reflecting patterns 16 formed on the reflective surface 1501 with reference to FIG. 3 and newly to FIG. 5. FIG. 5 is an enlarged perspective view showing the light reflecting patterns 16 formed on the reflective surface 1501.

The light reflecting patterns 16 formed on the reflective surface 1501 are shape patterns formed to reflect and scatter light incident on themselves. The reflective surface 1501 includes the light reflecting patterns 16 formed in a plurality of rows, each row consisting of a plurality of light reflecting patterns aligned in the sub-scanning direction, and the plurality of rows of light reflecting patterns 16 are arranged side by side in the main scanning direction. For example, the rows of light reflecting patterns 16 are formed from a portion of the reflective surface 1501 near the incident surface 18 to a portion thereof near the end surface of the light guide 11 opposite to the incident surface 18 in the main scanning direction.

If the light guide 11 had no light reflecting or scattering pattern, light incident on the interior of the light guide 11 through the incident surface 18 would propagate through the light guide 11 in the main scanning direction while being totally reflected on the outer peripheral surface of the light guide 11 and be finally guided to the end surface opposite to the incident surface 18 without leakage. In this case, the light from the light source 12 mounted on the incident surface 18 could not illuminate the original document. For this reason, the light reflecting patterns 16 are formed on the reflective surface 1501 opposite to the exit surface 17 to reflect the incident light to scatter in the sub-scanning direction.

As shown in FIG. 5, each light reflecting pattern 16 has an oval hemispherical shape rising toward the exit surface 17. The light reflecting pattern 16 is formed so that a first diameter A thereof along the sub-scanning direction (the direction perpendicular to the direction of the optical axis) is equal to or longer than a second diameter B thereof along the main scanning direction (the direction of the optical axis). In the case where the light reflecting pattern 16 has such an oval hemispherical shape, when light incident on the interior of the light guide 11 through the incident surface 18 is reflected on the light reflecting pattern 16, reflected light traveling toward the exit surface 17 and reflected light scattering in the sub-scanning direction while traveling toward the exit surface 17 are obtained. In this embodiment, the oval hemispherical shape includes a hemispherical shape.

A description will now be given of light diffusion in the sub-scanning direction in the case where light incident on a general light guide through the incident surface thereof is reflected on the reflective surface thereof and exits the light guide through the exit surface thereof. FIG. 6 is a view showing a light guide 110 having planar, not oval hemispherical, light reflecting patterns.

As shown in FIG. 6, a light guide 110 is generally known in which light reflecting patterns 160 formed of a prism having an inverted V-shape rising toward an exit surface 170 thereof are formed on a reflective surface 150 thereof. The light reflecting patterns 160 are formed integrally with the light guide 110 from the same material as the light guide 110. In such a light guide 110, the intensity of light reflected toward the exit surface 170 by reflecting pattern surfaces 1601 of the light reflecting patterns 160 can be controlled by varying among the light reflecting patterns 160 the pitch in the main scanning direction, height or width. Therefore, by controlling the pitch, height or width among the light reflecting patterns 160 arranged at different locations in the main scanning direction, illuminating light emitted from the different locations in the main scanning direction can be equalized.

Figure 7A:
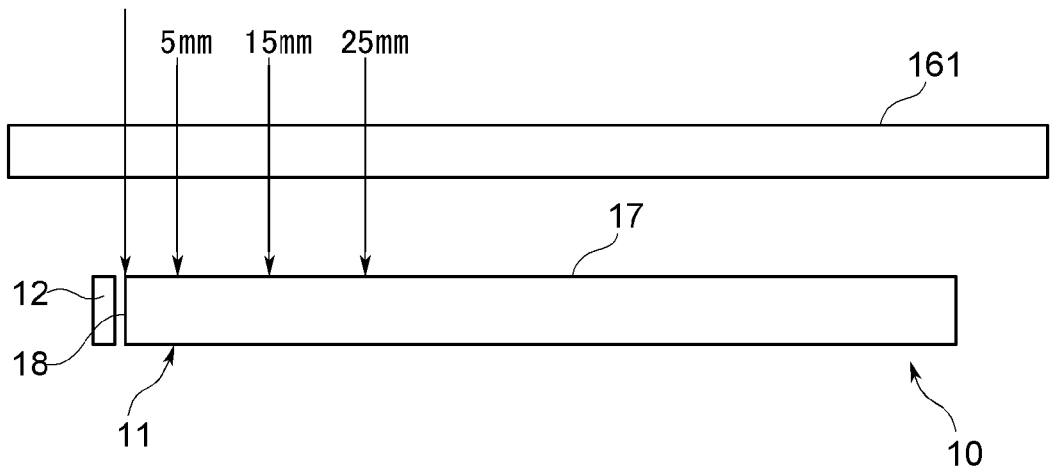
FIG. 7A is a view showing the positional relationship between the original glass plate and the light guide.
Figure 7B:
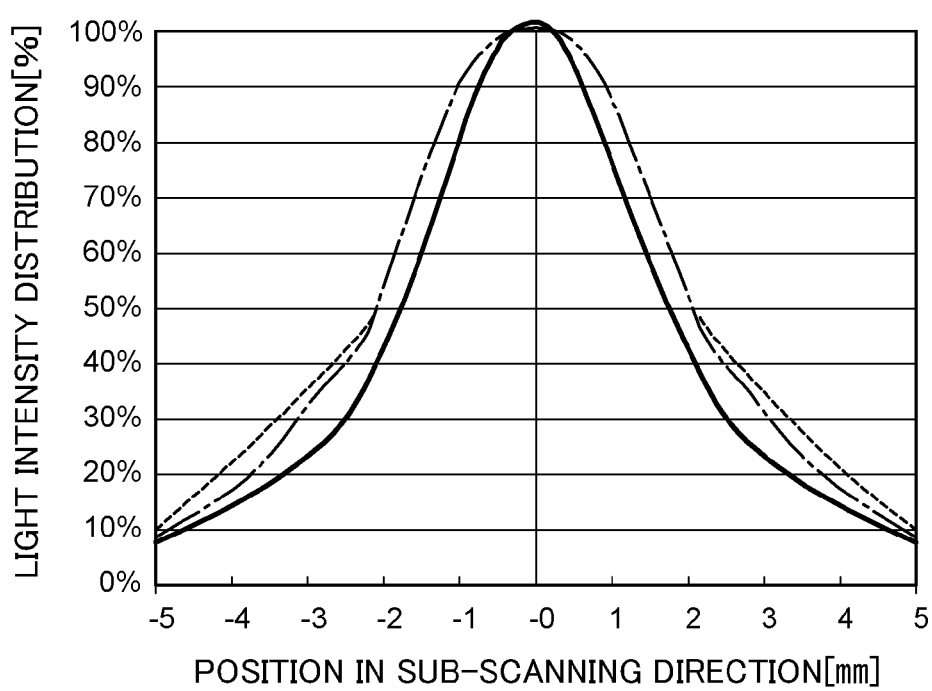
FIG. 7B is a graph showing the illumination distribution of indirect light of the light guide in the sub-scanning direction against the distance from a light source to various portions of the light guide in a main scanning direction.

FIG. 7A is a view showing the positional relationship between the original glass plate 161 and the light guide 11 and FIG. 7B is a graph showing the illumination distribution of indirect light of the light guide 110 in the sub-scanning direction against the distance from the light source 120 to various portions of the light guide 110 in the main scanning direction. A region of the light guide 110 near the light source 120 and the incident surface 130 in the main scanning direction provides much direct light and little indirect light, a middle region thereof provides mainly indirect light, and the angular distribution of light beams of indirect light incident on the light reflecting patterns 160 becomes smaller with the approach to the terminal end of the light guide 110. Since the region of the light guide 110 near the incident surface 130 provides much direct light and little indirect light, the exiting light from this region is, as far as the main scanning direction, exiting light diffused by the inverted V-shaped light reflecting patterns 160. On the other hand, as far as the sub-scanning direction, the exiting light is not diffused unless the number of times of reflection on curved surfaces of the light guide 110 other than the light reflecting patterns 160 is large. Therefore, the number of times of reflection near the incident surface 130 is small and the amount of diffusion light in the sub-scanning direction near the incident surface 130 is very small. Hence, only the region near the incident surface 130 is different from the other regions in terms of the distribution of light in the cross section of the light guide 110 taken along the sub-scanning direction. In this region, the light intensity is high near the optical axis but abruptly drops at locations off the optical axis.

In this regard, the oval hemispherical light reflecting pattern 16 is superior in light diffusion in the sub-scanning direction to the light reflecting pattern 160 formed of an inverted V-shaped prism. Therefore, the light reflecting patterns to be formed on the reflective surface 1501 are preferably oval hemispherical prisms.

Figure 8:
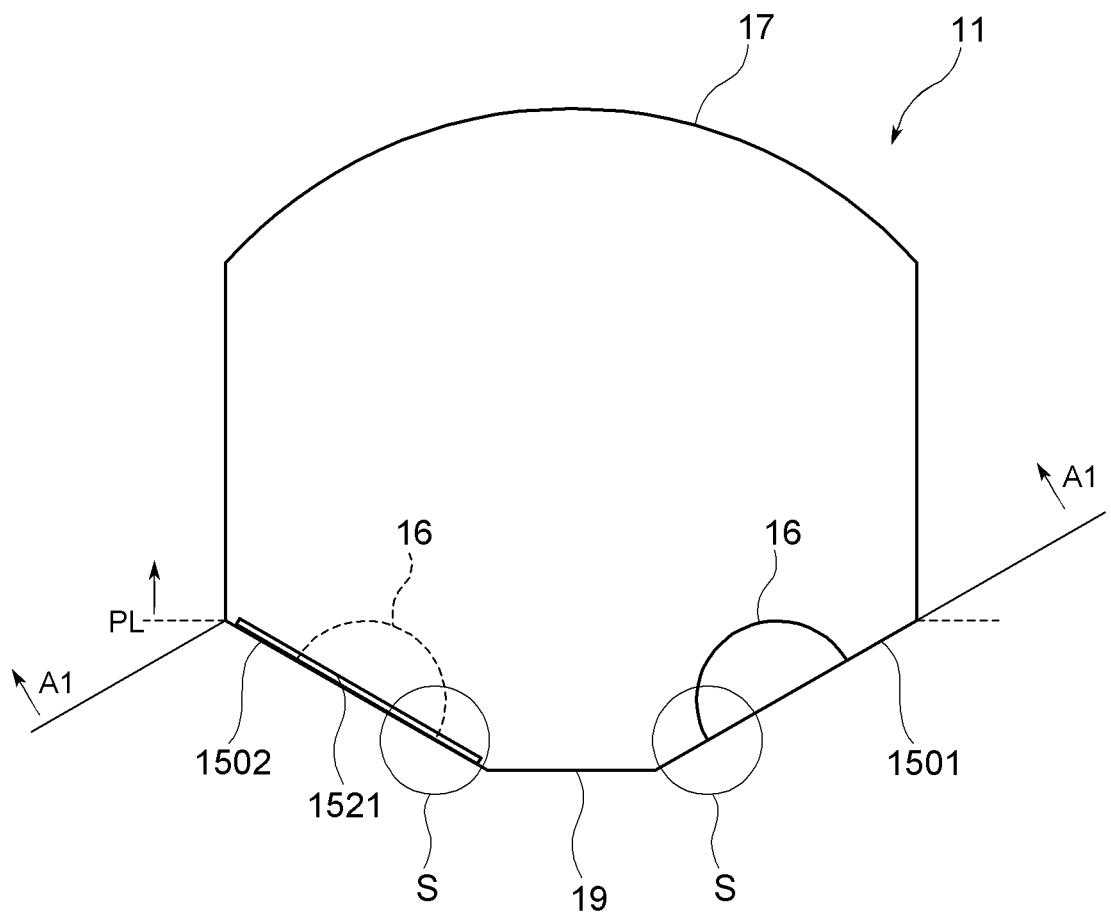
FIG. 8 is a side cross-sectional view showing the light guide according to the above embodiment taken along a direction perpendicular to a direction of an optical axis of the light guide.

FIG. 8 is a side cross-sectional view showing the light guide 11 according to this embodiment taken along a direction perpendicular to the direction of the optical axis of the light guide 11. As described above, the light reflecting patterns to be formed on the reflective surface 1501 are preferably oval hemispherical prisms. The light guide 11 according to this embodiment has two reflective surfaces 1501, 1502. If the oval hemispherical prisms were attempted to be formed on both the reflective surfaces 1501, 1502 and molded from a resin in a mold, the shapes S of lower portions of side surfaces of the oval hemispherical prisms would interfere with the mold during demolding from the mold and, therefore, the mold could not be drawn in a single direction, for example, in the direction PL shown in FIG. 8, after the molding of the oval hemispherical prisms.

Therefore, in the light guide 11 according to this embodiment, the light reflecting patterns 16 of oval hemispherical prism are formed only on the reflective surface 1501 and the reflective surface 1502 includes no oval hemispherical prism and is formed in a planar surface. Thus, as shown in FIG. 8, by selecting the direction of the arrow A1 as the demolding direction in resin molding, the mold can be drawn from the oval hemispherical prisms without interference with the shape S of lower portions of side surfaces of the oval hemispherical prisms.

When the light guide 11 is molded in a mold, the reflective surface 1502 is formed, for example, as a surface parallel to the direction of demolding of the light guide 11 from the mold.

After the light guide 11 is molded in the above manner, a reflective member is afterwards attached to the reflective surface 1502 by silk screening. Alternatively, a reflective member is attached as a high-reflection member to the reflective surface 1502.

The light guide 11 thus formed includes the light reflecting patterns 16 of oval hemispherical prism formed on the reflective surface 1501 and the reflective member on the reflective surface 1502. Therefore, the light guide 11 is applicable to an illumination device 10 of double-sided illumination type.

Furthermore, even if the reflective member is not attached to the reflective surface 1502 after the light guide 11 is molded in the above manner, the light guide 11 is applicable to an illumination device 10 of one-sided illumination type.

In a general light guide, the light source section of double-sided illumination type has two reflective surfaces. Therefore, even if the light guide is molded from resin in a mold to form oval hemispherical prisms on both the reflective surfaces and then attempted to be demolded, the selection of the demolding direction according to the shape of the prisms on either one of the reflective surfaces does not allow for the demolding of the prisms on the other reflective surface. In order to enable the demolding of the prisms on both the reflective surfaces, a special mold is required, resulting in a high cost. Furthermore, the light source section of one-sided illumination type may be essentially employed for the purpose of cost saving. In this case, it is necessary to select the use of the light source section of double-sided illumination type or the light source section of one-sided illumination type depending upon the product. If different molds are prepared for both the light guides of double-sided illumination type and of one-sided illumination type having a single reflective surface, this also results in a high cost.

Unlike the above general light guide, in the light guide 11 according to this embodiment, the reflective surface 1501 constituting one part of the reflective surface 15 is provided with the light reflecting patterns 16 of oval hemispherical prism and the reflective surface 1502 constituting the other part of the reflective surface 15 has a planar shape. Therefore, in molding the light guide 11 from resin in a mold, it is sufficient that the demolding direction is selected to allow for the demolding of the light reflecting patterns 16 of oval hemispherical prism formed on the reflective surface 1501. Since the reflective surface 1502 is planar and does not interfere with the demolding, the light guide 11 can be demolded at low cost without the use of any special mold.

Furthermore, the light guide 11 has such a configuration that the planar reflective surface 1502 enables the attachment of the reflective member 1521 thereto. The reflective member 1521 can be attached to the reflective surface 1502 after the molding of the light guide 11. Therefore, the light guide 11 molded in a single mold is applicable to both the double-sided illumination type and the one-sided illumination type. Hence, there is no need to prepare respective molds for the double-sided illumination type and the one-sided illumination type and the light guide 11 can be molded at low cost.

As thus far described, the light guide 11 according to this embodiment can be applied to both the double-sided illumination type and the one-sided illumination type without leading to a high cost and can provide an appropriate illumination distribution for each illumination type.

The present disclosure is not limited to the above embodiment and can be modified in various ways. For example, although in the above embodiment a structure has been described in which only one end surface of the light guide 11 in the main scanning direction provides an incident surface 18 and the light source 12 emits light from one longitudinal end of the light guide 11, another structure may be employed in which both end surfaces of the light guide 11 in the main scanning direction provide incident surfaces 18 and light sources 12 mounted to both the end surfaces emit light to the interior of the light guide 11.

Although the above embodiment includes LEDs 1210 as the light source 12, the light source used in the present disclosure is not limited to LEDs and can include various types of light sources so long as they can emit light in the main scanning direction toward the interior of the light guide 11.

The structure and processing shown in the above embodiment with reference to FIGS. 1 to 8 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

The invention claimed is:

1. A light guide formed of a light transmissive member extending in a direction of an optical axis of light incident on an interior of the light guide and configured to reflect the incident light in a specific direction, the light guide comprising:
    an incident surface provided at least one of both longitudinal ends of the light guide and allowing light emitted from a light source to be incident thereon;
    an exit surface forming one side surface of the light guide extending in the direction of the optical axis of the light incident through the incident surface, the exit surface allowing the incident light to exit the light guide therethrough; and
    two reflective surfaces located opposite to the exit surface to extend in the direction of the optical axis and configured to reflect the incident light toward the exit surface, and
    wherein one of the reflective surfaces includes a plurality of light reflecting patterns formed integrally therewith, the plurality of light reflecting patterns having an oval hemispherical prism shape rising toward the exit surface and being configured to reflect the incident light toward the exit surface, and the other reflective surface is a separate surface from the one reflective surface and is formed in a planar shape that enables attachment of a reflective member allowing the incident light to be reflected thereon toward the exit surface.

2. The light guide according to claim 1, wherein when the light guide is molded in a mold, the other reflective surface is formed as a surface parallel to a direction of demolding of the light guide from the mold.

3. The light guide according to claim 1, wherein the light reflecting patterns formed on the one reflective surface have an oval hemispherical shape rising toward the exit surface and designed so that a first diameter thereof perpendicular to the direction of the optical axis is equal to or longer than a second diameter thereof along the direction of the optical axis.

4. The light guide according to claims 1, wherein the reflective member is provided on the other reflective surface by silk screening.

5. The light guide according to claims 1, wherein the reflective member is provided from a high-reflection member on the other reflective surface.

6. The light guide according to claims 1, wherein each of both end surfaces of the light guide located at both the longitudinal ends thereof in the direction of the optical axis is the incident surface.

7. An illumination device comprising:
    a light guide formed of a light transmissive member extending in a direction of an optical axis of light incident on an interior of the light guide and configured to reflect the incident light in a specific direction; and
    a light source configured to emit light toward an interior of the light guide in a length direction of the light guide to allow the light to enter the light guide through an incident surface,
    wherein the light guide comprises:
    the incident surface provided at least one of both longitudinal ends of the light guide and allowing light emitted from the light source to be incident thereon;
    an exit surface forming one side surface of the light guide extending in the direction of the optical axis of the light incident through the incident surface, the exit surface allowing the incident light to exit the light guide therethrough; and two reflective surfaces located opposite to the exit surface to extend in the direction of the optical axis and configured to reflect the incident light toward the exit surface, and wherein one of the reflective surfaces includes a plurality of light reflecting patterns formed integrally therewith, the plurality of light reflecting patterns having an oval hemispherical prism shape rising toward the exit surface and being configured to reflect the incident light toward the exit surface, and the other reflective surface is a separate surface from the one reflective surface and is formed in a planar shape that enables attachment of a reflective member allowing the incident light to be reflected thereon toward the exit surface.

\* \* \* \* \*